United States Patent
Angulo Valpreda et al.

(10) Patent No.: US 8,344,537 B2
(45) Date of Patent: Jan. 1, 2013

(54) GENERATING STATION WHICH TRANSFORMS THE FORCE OF GRAVITY INTO ELECTRICITY

(76) Inventors: Victor Rene Angulo Valpreda, Santiago (CL); Mayra Palomares Coral, Barcelona (ES)

( * ) Notice: Subject to any disclaimer, the term of this patent is extended or adjusted under 35 U.S.C. 154(b) by 406 days.

(21) Appl. No.: 12/668,757

(22) PCT Filed: Jul. 11, 2008

(86) PCT No.: PCT/ES2008/000493
§ 371 (c)(1), (2), (4) Date: Jun. 1, 2010

(87) PCT Pub. No.: WO2009/010615
PCT Pub. Date: Jan. 22, 2009

(65) Prior Publication Data
US 2010/0270811 A1 Oct. 28, 2010

(30) Foreign Application Priority Data
Jul. 13, 2007 (CL) ................................. 2048-2007

(51) Int. Cl.
*F03B 13/00* (2006.01)
(52) U.S. Cl. ........................................................ 290/54
(58) Field of Classification Search .................. 290/43, 290/54
See application file for complete search history.

(56) References Cited

U.S. PATENT DOCUMENTS

| | | | |
|---|---|---|---|
| 4,698,516 A * | 10/1987 | Thompson | 290/54 |
| 6,445,078 B1 * | 9/2002 | Cieslak, Jr. | 290/1 R |
| 6,861,766 B2 * | 3/2005 | Rembert | 290/43 |
| 7,151,322 B2 * | 12/2006 | Eskandr | 290/1 R |
| 7,222,487 B1 * | 5/2007 | Hinkley | 60/639 |
| 7,233,078 B2 * | 6/2007 | Baarman et al. | 290/43 |
| 7,239,037 B2 * | 7/2007 | Alstot et al. | 290/54 |
| 2005/0052028 A1 | 3/2005 | Chiang | |

FOREIGN PATENT DOCUMENTS

| | | |
|---|---|---|
| CA | 2505625 | 10/2006 |
| ES | 2204255 | 4/2004 |

\* cited by examiner

*Primary Examiner* — Truc Nguyen
(74) *Attorney, Agent, or Firm* — Sturm & Fix LLP

(57) ABSTRACT

An electricity generating station using a method which enables the force of gravity to be transformed into electricity and which comprises two 6-meter diameter semi-solid combined structure axle-borne wheels which serve to increase the axle revolutions, two electricity generators, six direction reversers fitted to the axle, six plastic containers for transporting water, six chains enabling the reverser to raise and lower the six containers, two revolution step-up gears for increasing the revolutions, an electric pump for raising the water, a water valve which opens and closes for filling the containers, a back sluice for container draining, a pair of tanks and a network of PVC conduits.

12 Claims, 1 Drawing Sheet

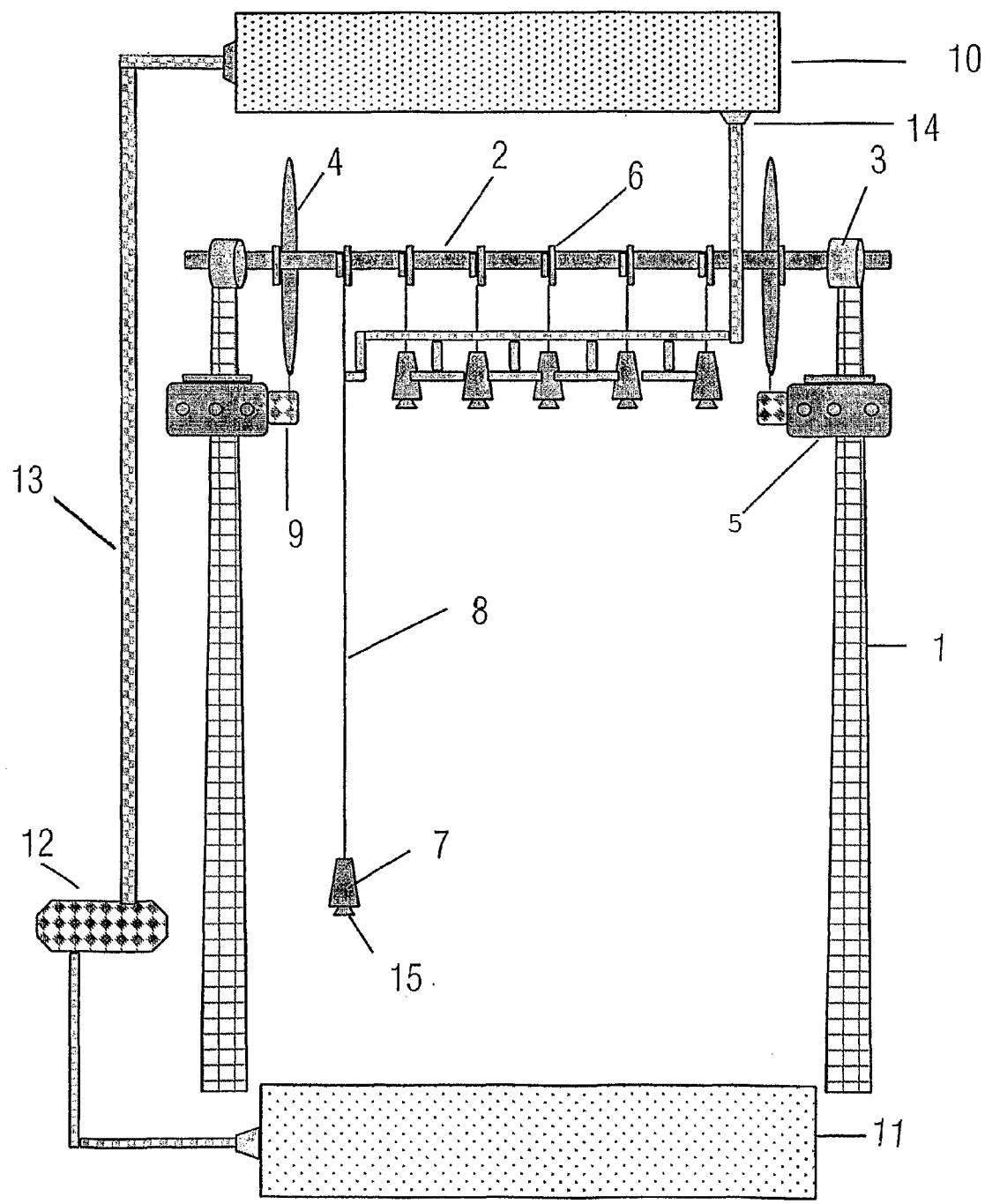

GENERATING STATION WHICH TRANSFORMS THE FORCE OF GRAVITY INTO ELECTRICITY

SUMMARY

1. Object of the Invention

An electricity generating station which uses a method that enables the force of gravity to be transformed into electricity.

2. Background of the Invention

Electricity generators are known that use or consume alternative sources of energy, that by means of special processes generate electricity, the energy that they use in many cases not being renewable or with scare availability, very costly development or which are very pollutant, to mention some of these; nuclear energy, wind power, the wave power of the sea tides, natural gas, liquefied or bio gas, coal, oil or diesel, hydropower and solar power are the energies that are currently being used to produce electricity which have the disadvantage of being conditioned or limited by the existence of these as alternative energies and which means going to their place to obtain them for production and their conversion into electricity.

The known technique shows some but not all of the most used energy forms to generate electricity whose use is only possible if they are available at the moment of being used as is well known electricity cannot be stored therefore it usually occurs that having the installations necessary for the production of electricity the energies consumed by the electricity generators are not available for reasons of nature, for example the power stations that consume water, wind depend on the fact that climatic conditions do not change leaving their reservoirs without water or the wind farms without wind, in the other cases when the power stations or electricity generators that use coal, gas, oil or nuclear power as alternative energy they depend on, as is well known, ever reducing existences, when solar energy is used it has the disadvantage of only being able to produce electricity during daylight and to use the power of the tide certain technical requirements have to be fulfilled which are not possible everywhere and finally when these alternative energies are not near, the transportation of the electricity has to be resolved across large distances so as to be used in the consumption centres.

DESCRIPTION OF THE INVENTION

This present invention shows an electricity generating station that uses the force of gravity as alternative energy for the production of electricity, creating the conditions and combined elements and ways that make the obtaining of electricity possible with this method.

Basically this electricity generating station always has the force of gravity available as alternative energy so as to generate electricity, considering that the force of gravity exists everywhere, is available at all times, is not pollutant and costs nothing. Therefore this generating station can be built anywhere that the production of electricity is required, mainly in the consumption centres doing away with or reducing the transport of electricity over long distances.

In order to have a better understanding of the invention it will be described on the basis of a preferred modality, which is shown in the drawing, which is by way of being an illustration, without it being by way of limitation on the scope of the invention or the dimensions or amount of the elements which are represented in it.

A BRIEF DESCRIPTION OF THE DRAWINGS

FIG. 1 is a drawing of the invention, the electricity generating station where the distribution of its elements and its workings are shown.

A DESCRIPTION OF A PREFERRED EMBODIMENT

As and how described in FIG. 1 the elements are and work in the following manner, two 30 meter high steel towers (1) that support a transverse steel axle at the ends and which has high mechanical resistance (2), this axle is supported on the towers by means of two speed regulating bearings (3) located on the upper part of the towers that are used to support the axle and enable it to rotate freely and control its speed. The towers, the axle and the bearings are designed to support a constant load on them. The axle bears two six-meter diameter wheels (4) at each end, as shown in FIG. 1, these wheels are made from steel that is similar to the bicycle wheels with a semi-solid combined structure, at each end of these wheels there is a revolution step-up gear (9) which in turn is connected to the electricity generator (5) on the axle there are also six direction reversers (6) one for each container with the power of being able to reverse the rotation in an order of the programme to rotate the opposite way of the axle rotation driven by the force of gravity up and down, the one thousand liter capacity plastic containers (7) which are hung from these direction reversers by a thirty meter long chain (8) that enables the container to move up and down accordingly, the generating station additionally has a water distribution system that consists of a ten thousand liter steel tank (10) located at the top of the generating station, another thirty thousand liter tank (11) located at the bottom of the generating station and a network of PVC conduits (13) distributed as shown in FIG. 1 between the two tanks and the six one thousand liter plastic containers and a pump (12) for raising the water to drive the water between the different tanks and containers.

The method to generate electricity is commenced considering that the thirty thousand and ten thousand liters tanks have water, and start with the filling of the one thousand liter water containers. It is carried out by opening the valve (14) located in the upper ten thousand liter tank and by means of the force of gravity and the PVC conduits installed for this operation. The water goes from the ten thousand liter tank to the six one thousand liter plastic tanks filling these occurs when, by means of a programme created for this method, the order is given to the first container to move downwards brought down by the force of gravity. This starts its downward run and by means of the chain pulls the reverser and this makes the axle rotate which in rotation makes the wheels rotate which transfer the constant rotation to the revolution step-up gear and this to the electricity generator which starts to produce electricity. On the downward movement the first container has done ninety percent of its run the programme determines that the second container, just like the first container pulls the axle by means of the chain fitted for this container so as to keep up the constant rotation of the axle. And when the first container finishes its run the second container maintains the rotation on the axle without a break enabling the system to continue generating electricity constantly. Once the first container finishes its downward run and the second container maintains the rotation of the axle, the programme determines the emptying of the water from the first one thousand liter container, an operation that is carried out by opening the back sluice of the container (15) that is specially designed for the automatic and rapid draining of the water. The water drawn off goes to the thirty thousand liter tank located in the bottom of the power station, transferring the water from the first container to the thirty thousand liter tank the programme gives the order to close the back sluice of the one thousand liter tank and it instructs the reverser gear of the first container so that it reverses the rotation and starts to pull the container upwards pushing it by the force that the second container is exercising on the axle on its downward movement. At this moment we have the first container without the one thousand liters of water going upwards and the second container loaded with water going downwards when this reaches ninety percent of its run, the programme activates the descent of the third container so as to keep the rotation on the axle constant which starts its downward run whilst the first container reaches the end of its upward run.

The programme commences the filling of the one thousand liters of water into the first container, an operation that consists of opening the filling valve and transferring the water from the upper ten thousand liter tank to the first one thousand liter container, whilst the second container has reached the end of its downward run and the removal of the water starts in the same way as the first container whilst the third container continues going down and maintaining the rotation of the axle the second container without water now carries out the upward process started by the order received in the second reverser which has reversed its rotation so as to lift the container whilst the first container has finished the filling of the thousand liters of water and the third container on then reaching ninety percent of its downward movement, the system activates the descent of the fourth container that starts its downward movement so as to maintain the constant rotation on the axle while the second container reaches its end of the upward run and the filling of the one thousand liters of water starts in the same way as the first container. The third container has reached the end of the downward run and the emptying of the water from same starts in the same way as the first container whilst the downward run of the fourth container continues maintaining the continuous rotation on the axle, the third container is now carrying out the upward process started by the order received from the third reverser gear which has inverted its rotation so as to raise the container without water while the second container has finished the filling of the one thousand liters of water and the fourth container having reached ninety percent of its downward run then the system activates the lowering of the fifth container so as to maintain the constant rotation on the axle which starts its run whilst the third container reaches the end of its upward run and the filling of the one thousand liters of water starts in the same way as the other containers. The fourth container has reached the end of its downward run and starts the emptying of water in just the same way as with the other containers. Whilst the fifth container continues the downward run maintaining the rotation on the axle, the fourth container is now carrying out the upward process started by the order received in the fourth reverser which has reversed its rotation to raise the container without water. While the third container has finished the filling of the one thousand liters of water and when the fifth container reaches ninety percent of its downward run the descent of the sixth container is activated by the system so as to maintain the constant rotation of the axle, which starts its downward run whilst the fourth container reaches its upward run and starts the filling of the one thousand liters of water in the same way as the previous containers. The fifth container has reached the end of its downward run and starts the emptying of the water in the same way as the previous containers whilst the sixth container continues its downward run and maintains the rotation on the axle. The fifth container without water is now carrying out the upward process started by the order received from the fifth reverser which has reversed its rotation so as to raise the container. Meanwhile the fourth container has finished the filling of the one thousand liters of water and the sixth container has reached ninety percent of its run then the system activates the descent of the first container so as to maintain constant the rotation on the axle and once again starting off a new cycle that maintains the axle rotation and as a result there is a constant generation of electricity.

When the generation of electricity is started the electric pump (12) for raising the water is started, this is located between the two tanks and its job is to raise the water from the lower thirty thousand liter tank to the upper ten thousand liter tank so as to maintain the availability of water in the upper tank and the containers.

The power station uses a specially created programme for the coordination of all of the movements so as to make the entirety of the elements interact in a synchronised manner.

TECHNICAL CONCEPTS OF THE INVENTION

The power station is able to use gravity which attracts the container as potential energy so that it moves downwards in this way the attraction downwards converts the vertical movement into kinetic energy which is used to make the axle to rotate and this latter in turn drives the generator to produce electricity.

Relationship of the conversion of the revolutions produced per minute by the method so as to generate electricity.

1—In one minute the container will be moved 5 meters.
2—The diameter of the wheel is 6 meters
3—The diameter of the reverser is 20 centimeters.
4—The diameter of the step-up gears is 20 centimeters.

The length around the perimeter of the 6 meter wheel is 18.84 meters;

The length around the perimeter of the 20 centimeter direction reverser is 0.62 meters;

The length around of the 20 centimeter the step-up gear is 0.62 meters;

CONCLUSIONS

1. We have to make the container run 5 meters in one minute making the rotation of the axle along with this run by means of the direction reverser whose perimeter is 0.62 meters thus the following gives 5 meters divided by 0.62 meters and the result of the rotation through which the axle will rotate is 8.06 times by 5 meters of the container run in one minute.

2. The axle on rotating 8.06 times the wheel that rotates at the same rate as this but its diameter is 6 meters and its perimeter which has a length of 18.84 meters on making contact it results in for each rotation of the reverser it makes an increase in the revolutions that are obtained from the multiplication of 8.06 by 18.84 this meaning that the increase in revolutions will be 151.85 rotations.

3. From the above result we take the 151.85 rotations to the step-up gear whose axle is 20 centimeters therefore the perimeter is 0.62 meters so, to complete a rotation needs 0.62 meters and it is receiving 151.85 meters. Because of this its yield will be the division of 151.85 meters divided by 0.62 and the result is 244.91 rotations of the axle.

On applying the 244.91 rotations to the step-up gear that is directly connected to the generator and, as its relationship is 1 to 55, therefore the total of revolutions from the method will be the multiplication of 244.91 by 55 and that is equal to 13,470 revolutions per minute.

The formula for the calculation of the power generated by of the invention:

Circular trajectory, in case of motors the work is expressed as follows:

POWER=Force×2×π×r, where π is a constant (3.1416) and r is the radius of rotation (0.10)

Force=1,000
Constant=2
Pi=3.1416
R=0.10

POWER=1,000 kilos×2×3.1416×0.10=628.32 KW

Calculation of the power generated by the invention $$T = \frac{D \times P}{N \times Pi} \text{ so } P = \frac{T \times N \times Pi}{D}$$

On considering this formula for the calculation of the power we have:

| | |
|---|---|
| T = Time | 33 |
| N = Force | 1000 |
| Pi = Constant | 3.1416 |
| D = Distance or run | 165 |

$$P = \frac{T \times N \times Pi}{D} = \frac{33 \times 1000 \times 3.1416}{165} = 628.32 \text{ KW OF POWER}$$

The invention claimed is:

1. An electricity generating station that uses the force of gravity to rotate an axle by use of a lowering of loads suspended from said axle, the electricity generating station comprising:
    at least two longitudinal towers, that support a transversally arranged axle at their ends, this axle is supported on the towers by two speed regulating bearings located at the upper ends of said towers, and are used to support said axle, which axle can rotate freely controlling its speed with respect to the towers;
    a plurality of water containers which are connected to said axle;
    a water distribution system made up of a first upper tank located at the upper part of the generating station, a second lower tank, located at the lower part of the generating station, a network of conduits distributed between said first upper tank, said second lower tank and a plurality of containers for transporting the water among them and a pump for raising water connected between said first upper tank and said second lower tank which is used to drive the water from the lower tank to the upper tank;
    the plurality of containers further comprising six containers, each one of these hanging and connected by a flexible member to a ratchet, where said six ratchets are assembled on the axle that allow the containers to move up and down;
    said axle has two grooved wheels at each end, wherein the ends of said wheels are directly connected to a revolution step-up gear which in turn is directly connected to an electricity generator.

2. An electricity generating station that uses the force of gravity to rotate an axle by use of the descent of loads suspended from said axle, according to claim 1, wherein the plastic containers are provided with a lower sluice for the automatic and fast draining of the water.

3. An electricity generating station that uses the force of gravity to rotate an axle by use of the descent of loads suspended from said axle, according to claim 1, wherein the electricity generating station is provided with a valve located in the upper tank that enables the containers to be filled with water.

4. An electricity generating station that uses the force of gravity to rotate an axle by use of the descent of loads suspended from said axle, according to any of claim 1, wherein said containers are one thousand liter capacity.

5. An electricity generating station that uses the force of gravity to rotate an axle by use of the descent of loads suspended from said axle, according to any of claim 1, wherein said first upper tank is ten thousand liter capacity.

6. An electricity generating station that uses the force of gravity to rotate an axle by use of the descent of loads suspended from said axle, according to any of claim 1, wherein said second lower tank is thirty thousand liter capacity.

7. An electricity generating station that uses the force of gravity to rotate an axle by use of the descent of loads suspended from said axle, according to any of claim 1, wherein said wheels have a six meter diameter.

8. A method to operate an electricity generating station that uses the force of gravity to rotate an axle using the descent of loads suspended from said axle, said electricity generating station being made up of at least two longitudinal towers that support a transversally arranged axle at the ends, this axle is borne on the towers by use of two speed regulating bearings located at the upper ends of said towers and are used as support for said axle which can rotate freely controlling its speed with respect to the towers; a plurality of water containers which are connected to said axle; a water distribution system that is made up of a first upper tank located on the upper part of the electricity generating station, a second lower tank, located on the lower part of the electricity generating station, a network of conduits distributed among said first upper tank, said second lower tank and said plurality of containers for transporting the water among them and a pump for raising water connected between said first upper tank and said second lower tank, which is used to drive the water from the lower tank to the upper tank, wherein the plurality of containers is made up of six containers, being each one of these hung and connected by a flexible line to a ratchet unit, wherein said ratchet unit includes six ratchets assembled on the axle that allow the containers to move up and down; and wherein said axle at each end, by way of fly wheels, wherein the ends of said wheels are directly connected to a revolution step-up gear which in turn is directly connected to an electricity generator;
    wherein said method comprises the stages of:
    (i) filling of the said lower tank and said upper tank with water;
    (ii) filling of the six containers with water by opening the valve connected to the upper tank;
    (iii) moving the first container downward using the force of gravity, starting its downward run by use of the flexible line that pulls on the ratchet, making the axle rotate, which in turn makes the wheels rotate which transfers constant rotation to the revolution step-up gears and this, in turn, to the electricity generator;
    (iv) waiting until ninety percent of the downward run of the first container is in its downward movement;
    (v) moving the second container downwards which pulls on the axle through use of flexible line while maintaining the constant rotation on the axle;

(vi) when the first container has reached one hundred percent of its downward run and the second container has kept up the rotation on the axle, opening the back sluice of the container to drain the water and depositing the water in said lower tank;

(vii) closing the sluice of the first container once the water has been drained;

(viii) reversing the rotation of the ratchet of the first container, this reversing of the rotation of the ratchet being driven by the force that is being exercised on the axle by the second container on its downward movement, whereby the first container goes upward;

(ix) filling the container with water when it reaches the position of final ascent;

(x) waiting until ninety percent of the downward run of the second container in its downward movement;

(xi) moving the third container downward which pulls on the axle through use of the chain maintaining the constant rotation in the axle;

(xii) when the second container has reached one hundred percent of its downward run and the third container has kept up the rotation on the axle, opening the back sluice of the second container to drain the water and deposit the water in said lower tank;

(xiii) closing the sluice of the second container once the water has been drained;

(xiv) reversing the rotation of the ratchet of the second container, this reversing of the rotation of the ratchet being driven by the force that is being exercised on the axle by the third container on its downward movement, whereby the second container goes upward;

(xv) filling the second container with water when it reaches the position of final ascent;

(xvi) waiting until ninety percent of the downward run of the third container in its downward movement;

(xvii) moving the fourth container downward, which pulls on the axle by use of the chain maintaining the constant rotation in the axle;

(xviii) when the third container has reached one hundred percent of its downward run and the fourth container has kept up the rotation on the axle, opening the back sluice of the third container to drain the water and depositing it in said lower tank;

(xix) closing the sluice of the third container once the water has been drained;

(xx) reversing the rotation of the ratchet of the third container, this reversing of the rotation of the ratchet being driven by the force that is being exercised on the axle by the fourth container on its downward movement, whereby the third container goes upward;

(xxi) filling the third container with water when this third container reaches the position of final ascent;

(xxii) waiting until ninety percent of the downward run of the fourth container in its downward movement;

(xxiii) moving the fifth container downward which pulls on the axle by use of the chain maintaining the constant rotation in the axle;

(xxiv) when the fourth container has reached one hundred percent of its downward run and the fifth container has kept up the rotation on the axle, opening the back sluice of the fourth container to drain the water depositing it in said lower tank;

(xxv) closing the sluice of the fourth container once the water has been drained;

(xxvi) reversing the rotation of the ratchet of the fourth container, this being driven by the force that is being exercised on the axle by the fifth container on its downward movement, whereby the fourth container goes upward;

(xxvii) filling the fourth container with water when it reaches the position of final ascent;

(xxviii) waiting until ninety percent of the downward run of the fifth container is in its downward movement;

(xxix) moving the sixth container downwards which pulls on the axle by use of the chain maintaining the constant rotation in the axle;

(xxx) when the fifth container has reached one hundred percent of its downward run and the sixth container has kept up the rotation on the axle, opening the back sluice of the fifth container to drain the water depositing it in said lower tank;

(xxxi) closing the sluice of the fifth container once the water has been drained;

(xxxii) reversing the rotation of the ratchet of the fifth container, this reversing of the rotation of the ratchet being driven by the force that is being exerted on the axle by the sixth container on its downward movement, whereby the fifth container goes upward;

(xxxiii) filling the fifth container with water when it reaches the position of final ascent;

(xxxiv) waiting until ninety percent of the downward run of the sixth container is in its downward movement;

(xxxv) moving the first container downward which pulls on the axle by use of the chain maintaining the constant rotation in the axle;

(xxxvi) when the sixth container has reached one hundred percent of its downward run and the first container has kept up the rotation on the axle, opening the back sluice of the sixth container to drain the water and depositing it in said lower tank;

(xxxvii) closing the sluice of the sixth container once the water has been drained;

(xxxviii) reversing the rotation of the ratchet of the sixth container, this reversing of the rotation of the ratchet being driven by the force that is being exercised on the axle by the first container on its downward run, whereby the sixth container goes upward;

(xxxix) filling the sixth container with water when it reaches the position of final ascent;

(xxxx) return to step (v).

9. A method to operate an electricity generating station that uses the force of gravity to rotate an axle by use of the descent of loads suspended from said axle, according to claim 8, wherein when the continuous cycle of electricity generation is started it is activated an electric pump for raising water located between the lower tank and said upper tank so as to maintain the availability of water in the power station.

10. An electricity generating station that uses the force of gravity to rotate an axle by use of loads suspended from said axle, according to claim 8, wherein in stage (i) said first upper tank is filled with ten thousand liters.

11. An electricity generating station that uses the force of gravity to rotate an axle by use of loads suspended from said axle, according to claim 8, wherein in stage (i) said second lower tank is filled with thirty thousand liters.

12. A method of operating an electricity generating station that uses the force of gravity to rotate an axle by use of the descent of loads suspended from said axle, according to claim 8, wherein in stage (ii) said containers are filled with one thousand liters.

* * * * *